United States Patent [19]

Minassian et al.

[11] Patent Number: 5,133,078
[45] Date of Patent: Jul. 21, 1992

[54] SERIAL FRAME PROCESSING SYSTEM IN WHICH VALIDATION AND TRANSFER OF A FRAME'S DATA FROM INPUT BUFFER TO OUTPUT BUFFER PROCEED CONCURRENTLY

[75] Inventors: Vahe A. Minassian, Woodstock; Gerald H. Miracle, Pleasant Valley; Richard A. Neuner, Port Ewen; Peter L. Potvin, Ulster Park, all of N.Y.

[73] Assignee: International Business Machines Corporation, Armonk, N.Y.

[21] Appl. No.: 392,867

[22] Filed: Aug. 11, 1989

[51] Int. Cl.⁵ .............................. G06F 13/00
[52] U.S. Cl. ............................... 395/800; 364/270.5; 364/271; 364/238.6; 364/239; 364/DIG. 1
[58] Field of Search ............... 370/60, 105.1; 340/825.65; 395/800; 364/200 MS File, 900 MS File

[56] References Cited

U.S. PATENT DOCUMENTS

| | | | |
|---|---|---|---|
| 4,156,907 | 5/1979 | Rawlings et al. | 364/200 |
| 4,228,496 | 10/1980 | Katzman et al. | 364/200 |
| 4,247,910 | 1/1981 | Cornell et al. | 364/900 |
| 4,429,386 | 1/1984 | Graden | 370/100 |
| 4,492,956 | 1/1985 | Collmeyer et al. | 340/723 |
| 4,663,706 | 5/1987 | Allen et al. | 364/200 |
| 4,665,517 | 5/1987 | Widmer | 370/86 |
| 4,667,287 | 5/1987 | Allen et al. | 364/200 |
| 4,813,012 | 3/1989 | Valeri et al. | 364/200 |
| 4,827,477 | 5/1989 | Avaneas | 371/37 |
| 4,841,475 | 6/1989 | Ishizuka | 364/900 |
| 4,866,609 | 9/1989 | Calta et al. | 364/200 |
| 4,979,108 | 12/1990 | Crabbe, Jr. | 364/200 |

OTHER PUBLICATIONS

A. L. Bergey et al., *IBM Technical Disclosure Bulletin*, vol. 23, No. 10, pp. 4672-4678 (Mar. 1981).
D. C. Haigh, *IBM TDB*, vol. 24, No. 12, pp. 6240-6243 (May 1982).
C. S. Lanier, *IBM TDB*, vol. 26, No. 4, pp. 1870-1873 (Sep. 1983).

*Primary Examiner*—Thomas C. Lee
*Assistant Examiner*—William M. Treat
*Attorney, Agent, or Firm*—William A. Kinnaman; Michael J. Scheer

[57] ABSTRACT

An asynchronous high-speed data interface for coupling a serial channel to a parallel control unit. A first state machine, running synchronously with the channel transmitter clock, controls the filling of a pair of dual-port input buffers in alternating fashion with frame contents bytes from incoming serial frames that have been deserialized and decoded. A second state machine, running synchronously with a second clock that is asynchronous with the channel transmitter clock, controls the transfer of the frame contents bytes from the selected input buffer to one of a pair of output buffers en route to the control unit. Upon detecting the receipt of the third incoming frame contents byte, the first state machine sets a start latch, causing the second state machine to begin transferring data from the selected input buffer to the selected output buffer while the input buffer is still being filled. Means are provided for disregarding the frame contents bytes that have been transferred to the selected output buffer if the frame is ultimately aborted.

21 Claims, 16 Drawing Sheets

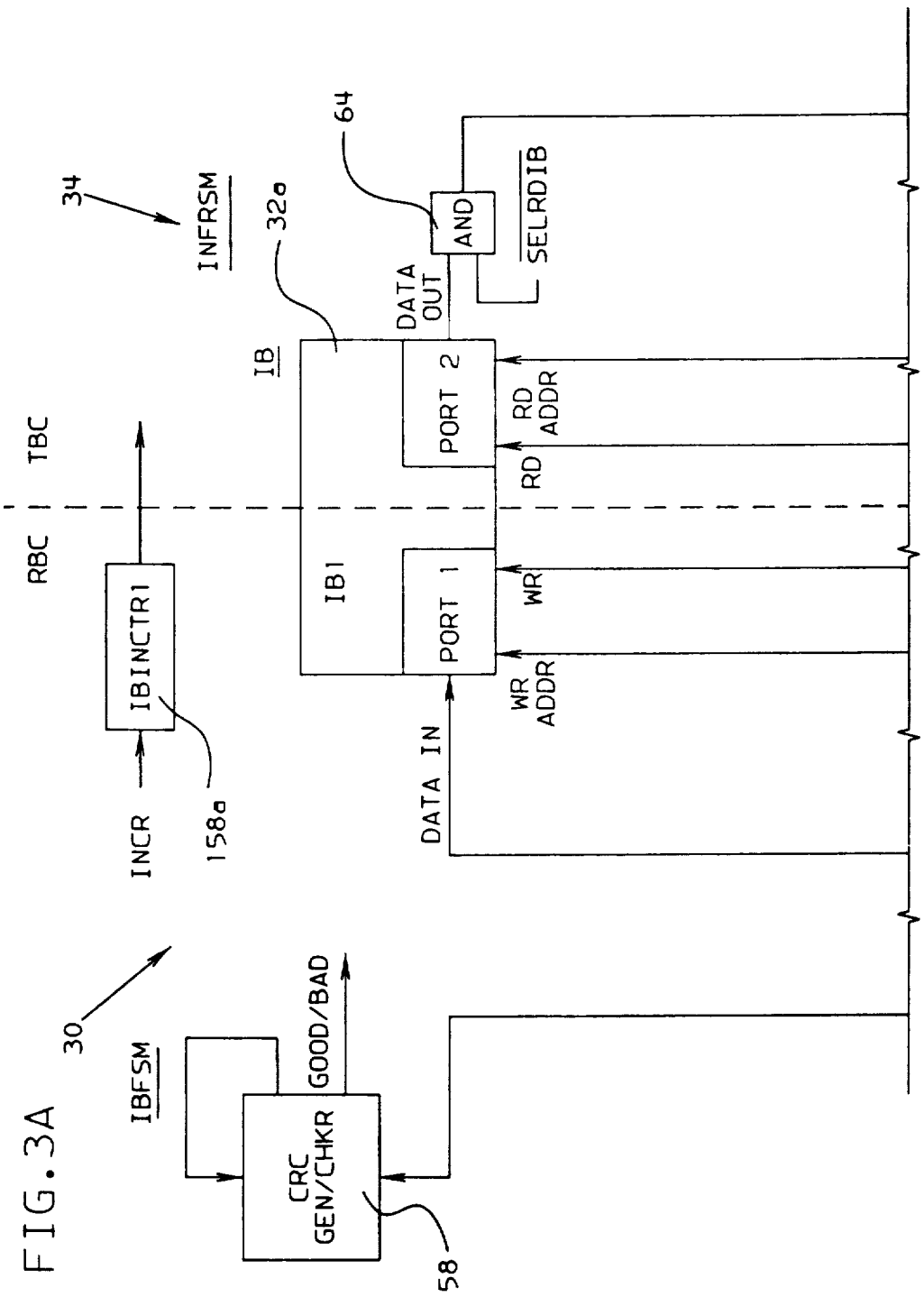

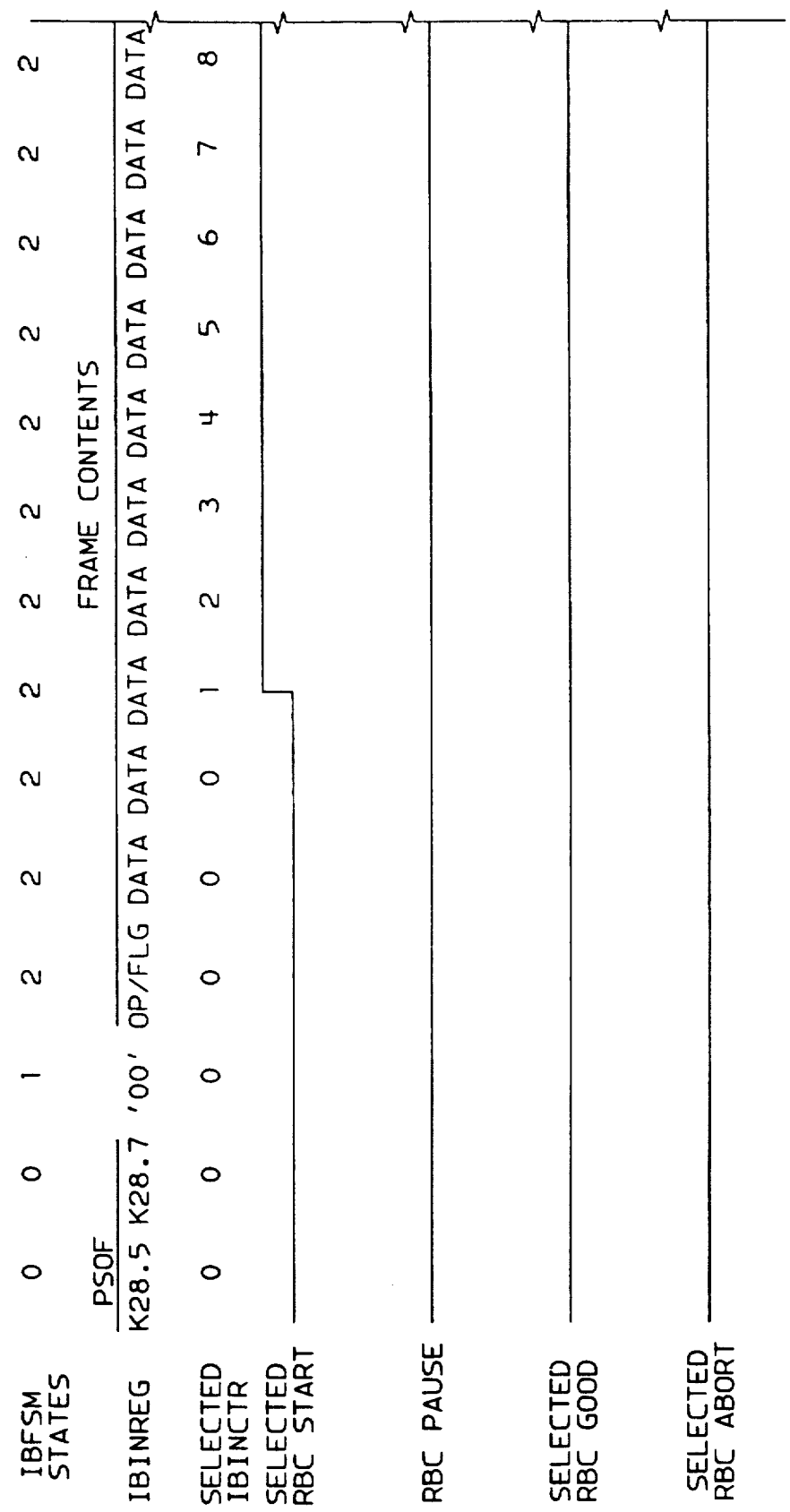

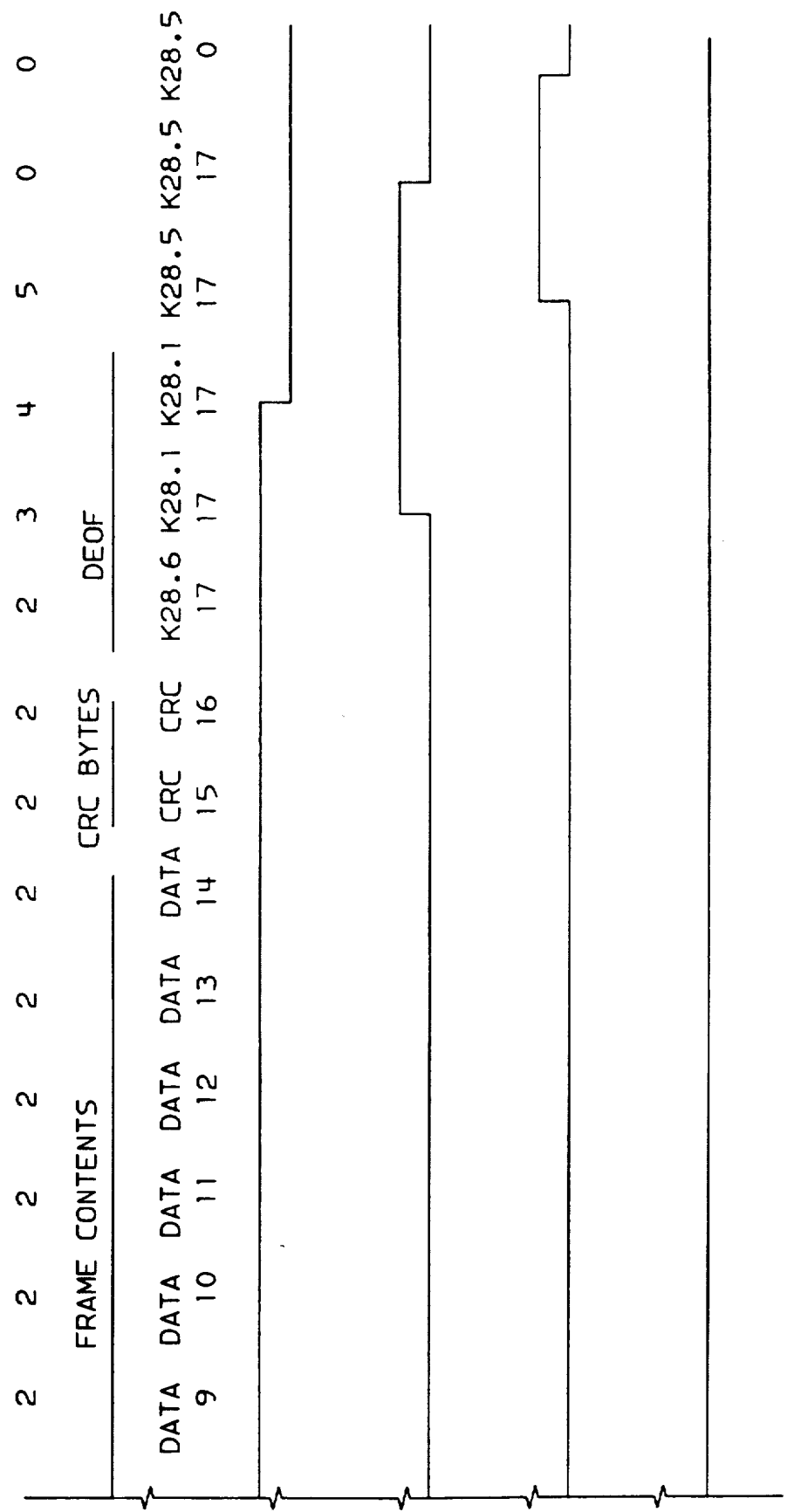

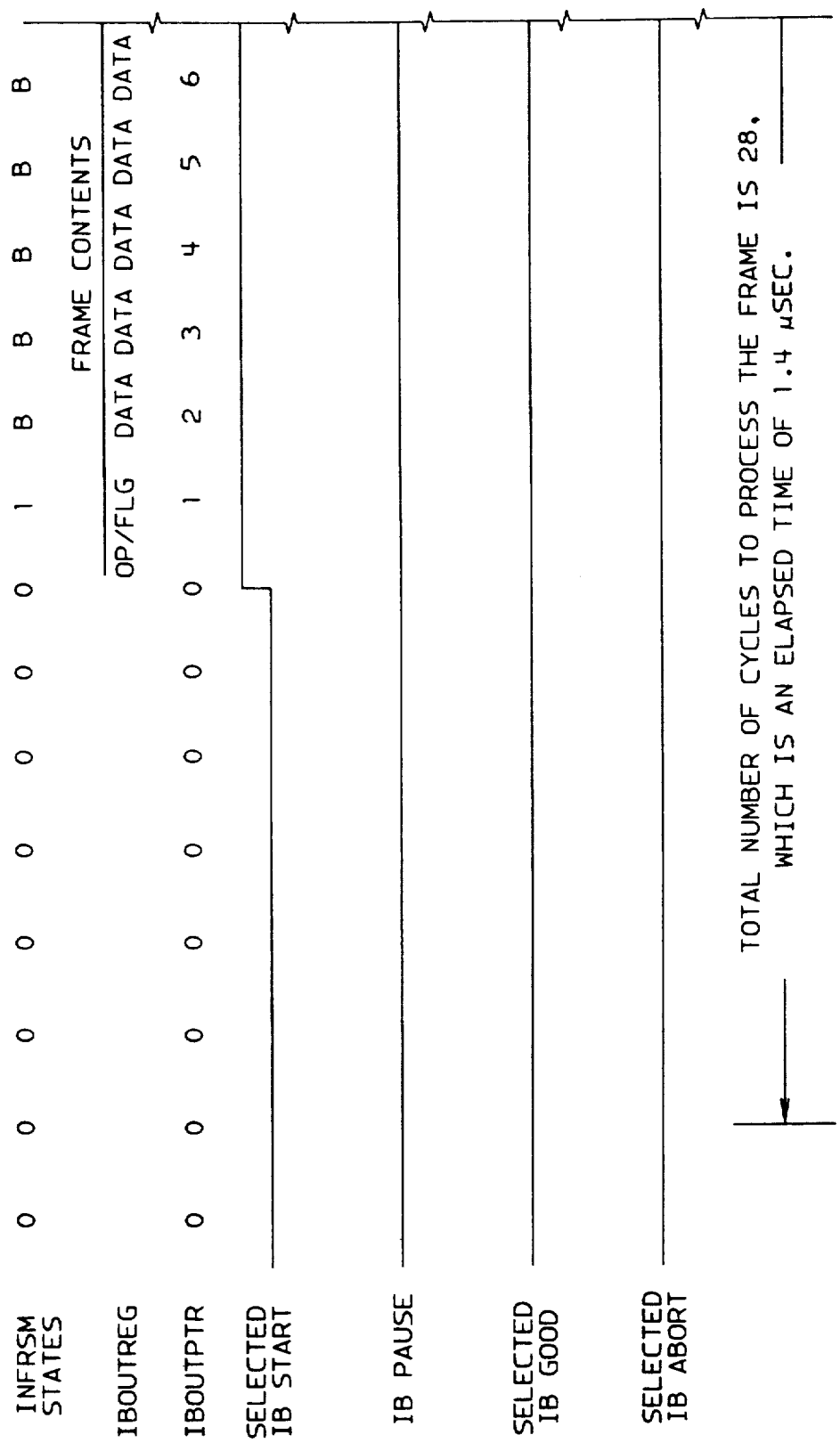

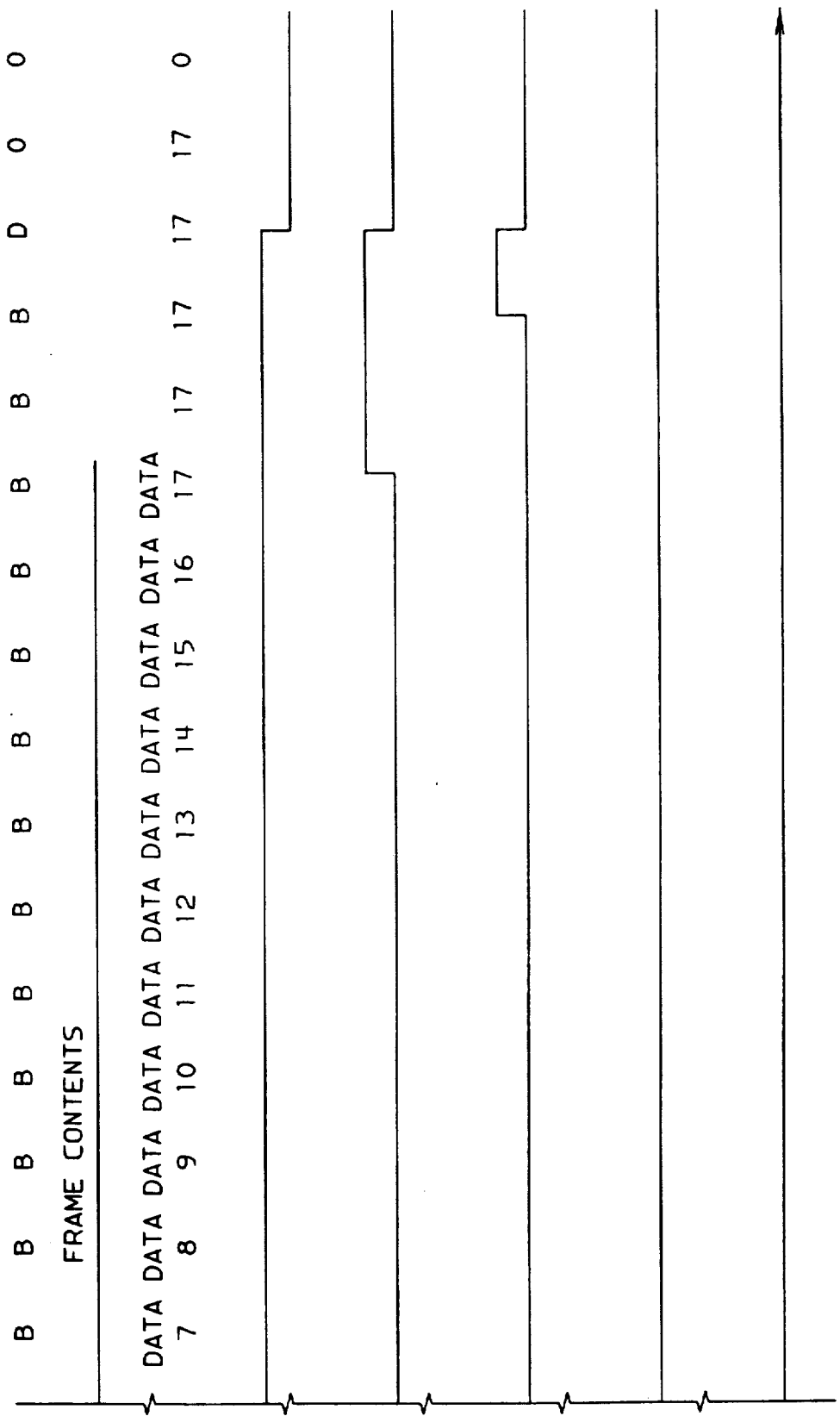

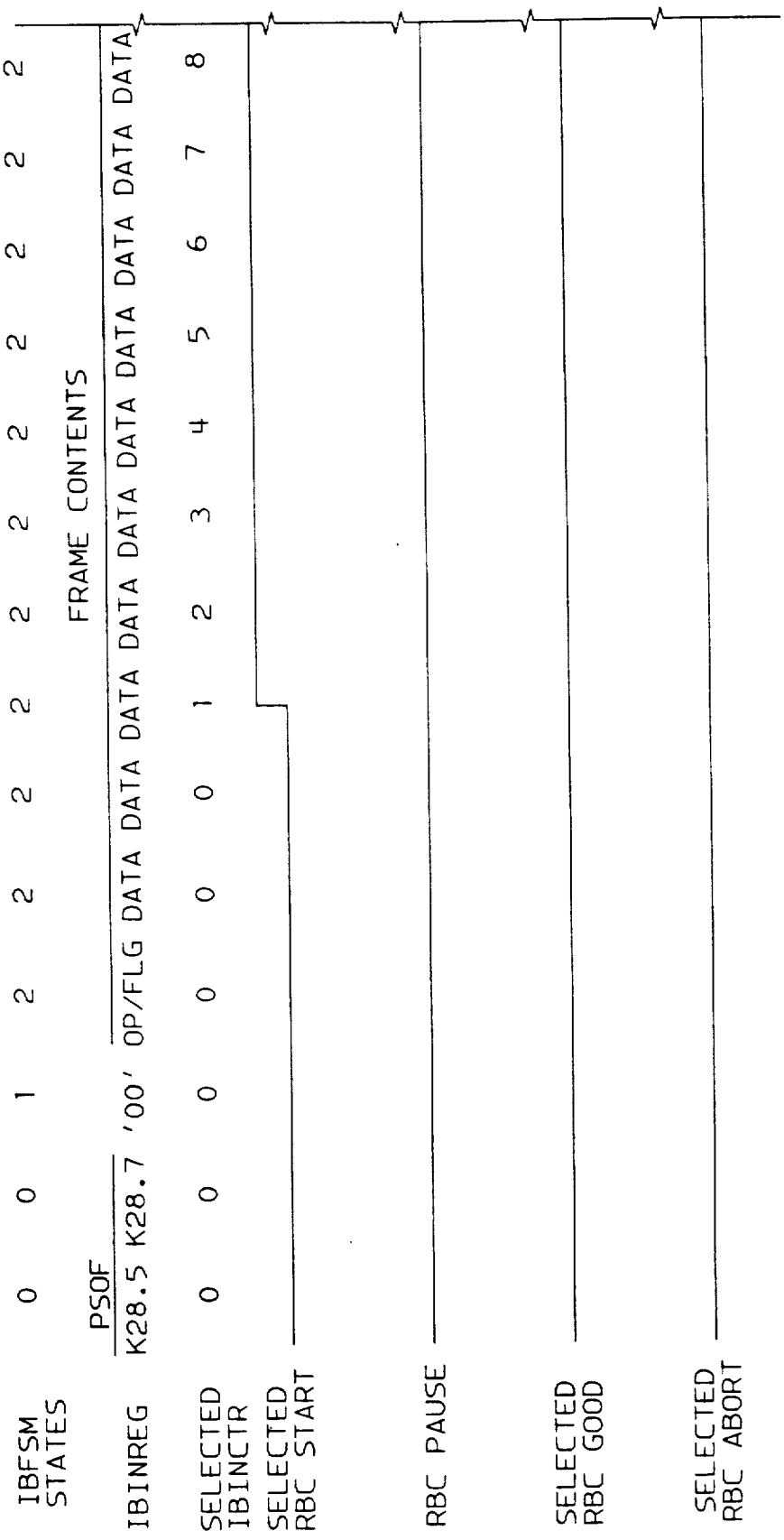

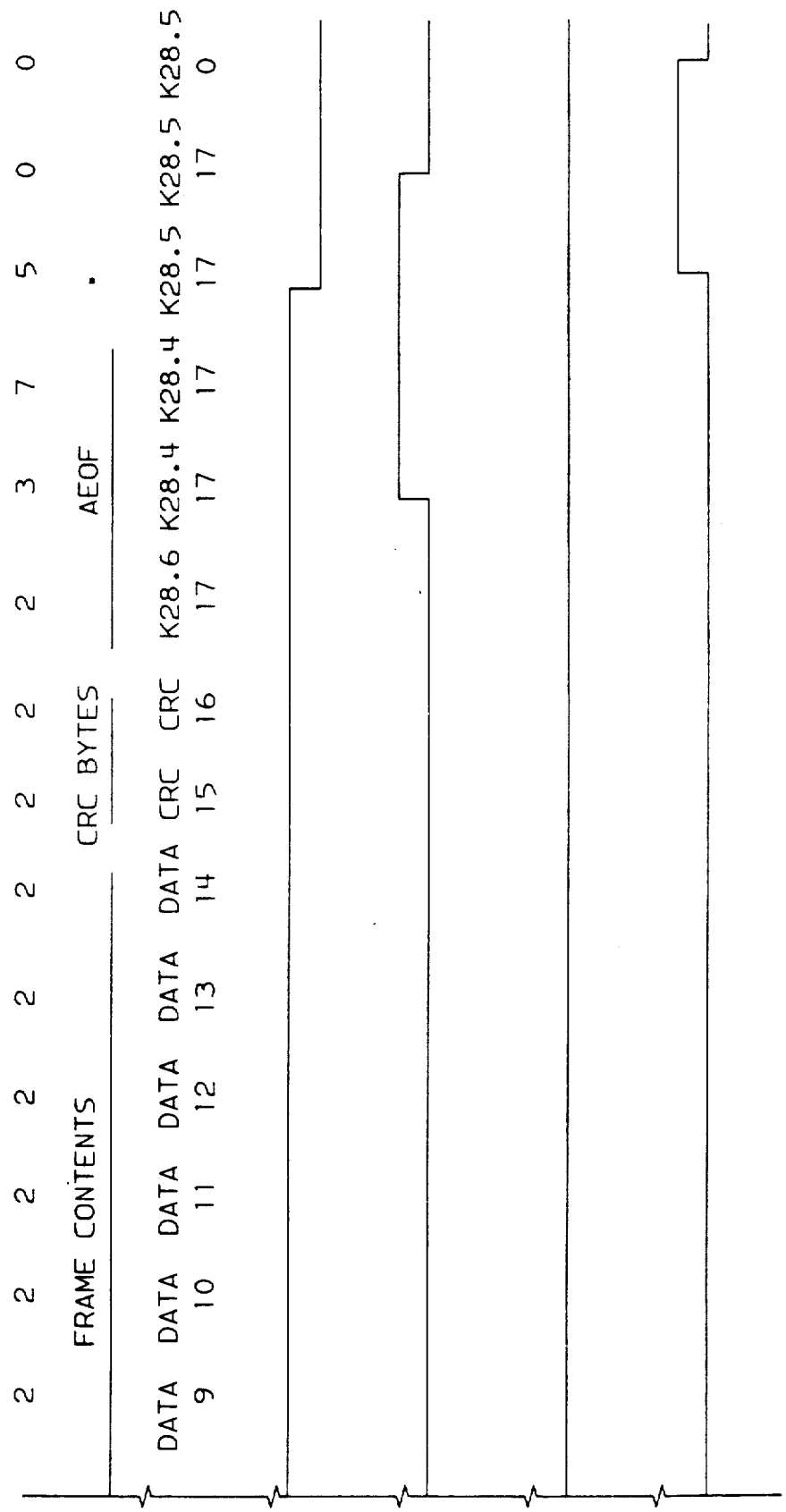

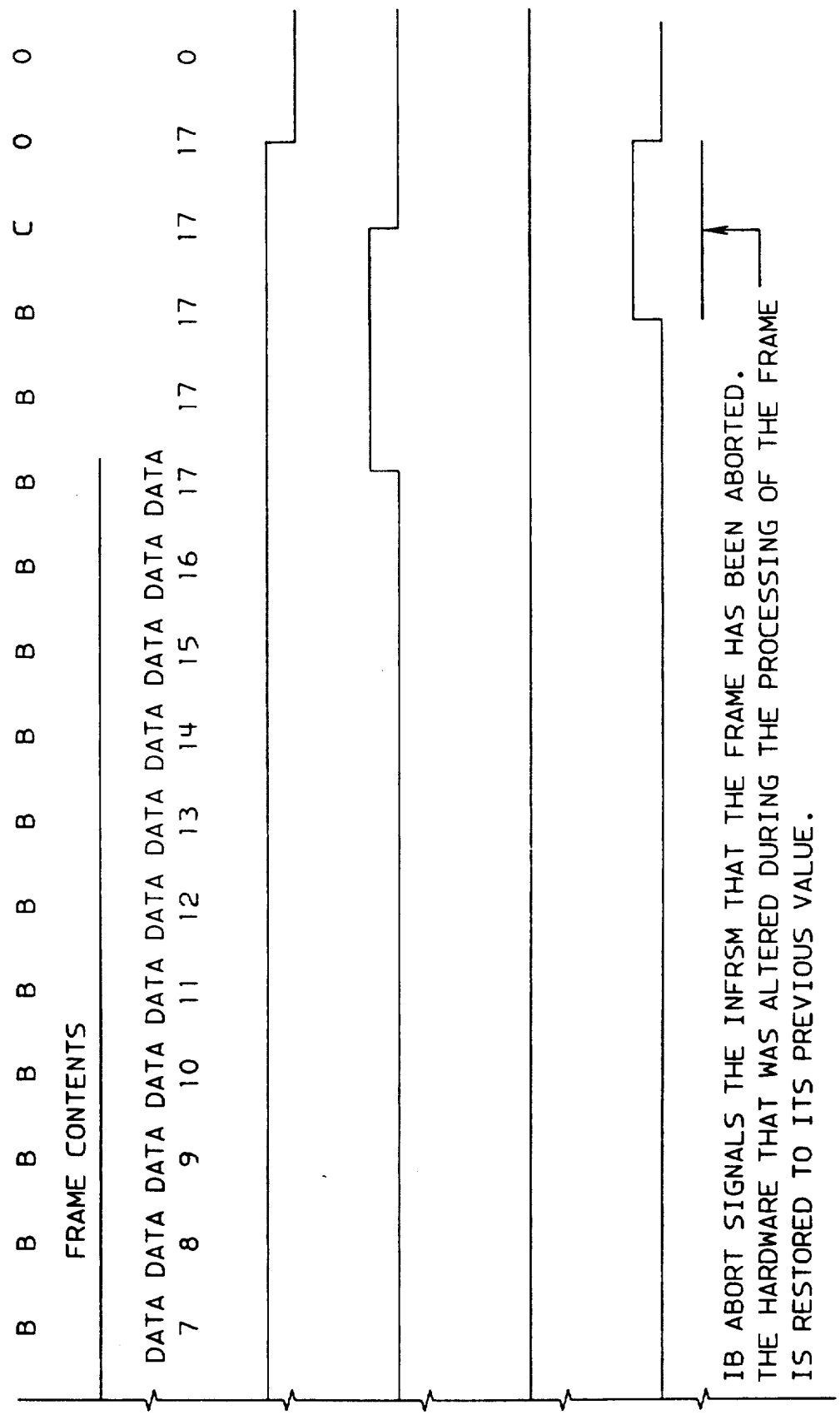

SERIAL FRAME PROCESSING SYSTEM IN WHICH VALIDATION AND TRANSFER OF A FRAME'S DATA FROM INPUT BUFFER TO OUTPUT BUFFER PROCEED CONCURRENTLY

BACKGROUND OF THE INVENTION

1. Field of the Invention

This invention relates to an asynchronous high-speed data interface for processing serial data frames and, more particularly, to such an interface for processing frames originating from a serial channel and destined for a control unit having a parallel interface.

2. Description of the Related Art

The copending application of D. F. Casper, J. R. Flanagan, G. H. Miracle, R. A. Neuner and P. L. Potvin, Ser. No. 07/392,754, entitled "Apparatus for Interconnecting a Control Unit Having a Parallel Bus with a Channel Having a Serial Link", and the copending application of M. E. Carey, G. H. Miracle, J. T. Moyer, and R. A. Neuner, Ser. No. 07/392,629 entitled "Channel and Extender Unit Operable with Byte Mode or Non-Byte Mode Control Units", both owned by the assignee of this application and filed on even date herewith, describe a fiber-optic-extended parallel channel emulator. As described in those applications, the total extended channel consists of a cooperating serial channel, associated with a host processor, which is connected through a serial fiber-optic link to an extender unit coupled to one or more parallel control units. The control units in turn handle devices, especially direct-access storage devices (DASD) such as magnetic disk drives. The serial protocols for communicating over the fiber-optic link and the format of the serial frames transmitted over the link are also described in the above-identified copending application of D. F. Casper et al. The use of the serial fiber-optic link between the serial channel and the extender unit allows control units to be placed up to 3 km from the channel (1 km in the case of certain time-critical control units), as contrasted with a distance of about 400 feet for conventional parallel channels and control units.

In the system described in the copending applications referred to above, the channel and the extender unit coupled by the fiber-optic link are timed by clocks which, although having the same nominal frequency, run asynchronously with each other. In the extender unit, frames arriving from the channel are received under the control of a clock that is synchronous with the channel transmitter clock and are later processed under the control of a clock that is used generally to time the extender unit logic and is asynchronous with the channel transmitter clock. Such asynchronism between the receiving of the serial frame and its later processing usually requires that the entire frame be received in an input buffer and checked for validity before the frame is further processed. This requirement significantly limits the data transmission rate and may result in an input buffer overrun if two consecutive frames are spaced two closely together. Further, the necessity of receiving the entire frame in the input buffer before proceeding with later processing increases the effective latency period of the device connected to the control unit.

SUMMARY OF THE INVENTION

A principal object of the present invention is to provide a data interface that handles data that is asynchronous with circuits that later process the data.

A further object of the present invention is to provide a data interface that is capable of high-speed operation without data overrun.

In general, the present invention contemplates an asynchronous data interface for processing serial data frames, such as those originating from a serial channel, transmitted in synchronism with a first clock in which a first clocked logic circuit operating synchronously with the first clock fills an input buffer with data from the frames. A second clocked logic circuit operating synchronously with a second clock that is asynchronous with the first clock begins emptying data from the buffer before the first clocked logic circuit has completed its filling operation.

More specifically, in the preferred form of the invention, the frames comprise (1) a start-of-frame (SOF) delimiter (in particular a passive-start-of-frame (PSOF) delimiter) (2) data-type characters including one or more frame contents bytes and one or more cyclic redundancy check (CRC) bytes, and (3) an end-of-frame (EOF) delimiter which may be either a normal disconnect-end-of-frame (DEOF) delimiter or an abort-end-of-frame (AEOF) delimiter. The first clocked logic circuit begins to fill the input buffer in synchronism with the first clock upon detecting an SOF delimiter and, optionally, other non-frame contents bytes such as an architecture identifier (AID) or the like. Upon detecting the receipt of a predetermined number of frame contents bytes, preferably three, the first clocked logic circuit sets a start latch to signal the second clocked logic circuit to begin emptying the data bytes from the input buffer into an output buffer in synchronism with the second clock.

The second clocked logic circuit uses a pointer register to address the output buffer. Upon detecting the setting of the start latch, and before initiating the transfer of data from the input buffer to the output buffer, the second clocked logic circuit stores the existing contents of the pointer register in a backup pointer register. As the second clocked logic circuit transfers successive frame contents bytes from the input buffer to the output buffer, it increments a backup byte counter used to keep track of the number of bytes in the output buffer awaiting further processing. The backup byte counter is readable only by the second clocked logic circuit, and not by the logic circuit that further processes the data in the output buffer.

Upon detecting the start of an EOF delimiter, the first clocked logic circuit performs a CRC check and sets a pause latch, signaling the second clocked logic circuit to halt temporarily the further transfer of data from the input buffer to the output buffer. If the EOF delimiter is a normal EOF delimiter, and if the CRC check is satisfactory, the first clocked logic circuit sets a "good" latch, signaling the second logic circuit to complete the transfer of the frame data from the input buffer to the output buffer. On completion of the data transfer, the second clocked logic circuit transfers the contents of the backup byte counter to the principal byte counter that is readable by other logic circuitry.

On the other hand, if the EOF delimiter is found to be an abort EOF delimiter, the first clocked logic circuit sets an abort latch, signaling the second clocked logic circuit to abort the transfer sequence. In this case, the second clocked logic circuit transfer the contents of the backup pointer register to the principal pointer register, and transfers the contents of the principal byte counter to the backup byte counter. Thus, even though portions of the aborted frame have been transferred to the output buffer, they are, in effect, invisible to the external circuitry and will be overwritten when the next frame is received.

By providing this capability for disregarding the portion of an aborted frame that has already been transferred from the input buffer, the present invention permits the transfer of contents from the input buffer to the output buffer before the incoming frame is completely received and checked for validity. By delaying the transfer from the input buffer until a predetermined number of incoming frame contents bytes have been received, one ensures that the second clocked logic circuit will always have data in the input buffer to transfer to the output buffer while the input buffer is being filled.

BRIEF DESCRIPTION OF THE DRAWINGS

FIGS. 3A and 3B are a schematic block diagram of the input buffer and associated circuitry of the extender unit shown in FIG. 2.

FIGS. 7A, 7B, 7C, and 7D are timing diagrams illustrating the processing of a normal write data frame by the extender unit shown in FIG. 2

FIGS. 8A, 8B, 8C, and 8D are timing diagrams illustrating the processing of an aborted write data frame by the extender unit shown in FIG. 2.

DESCRIPTION OF THE PREFERRED EMBODIMENT

Figure 1:
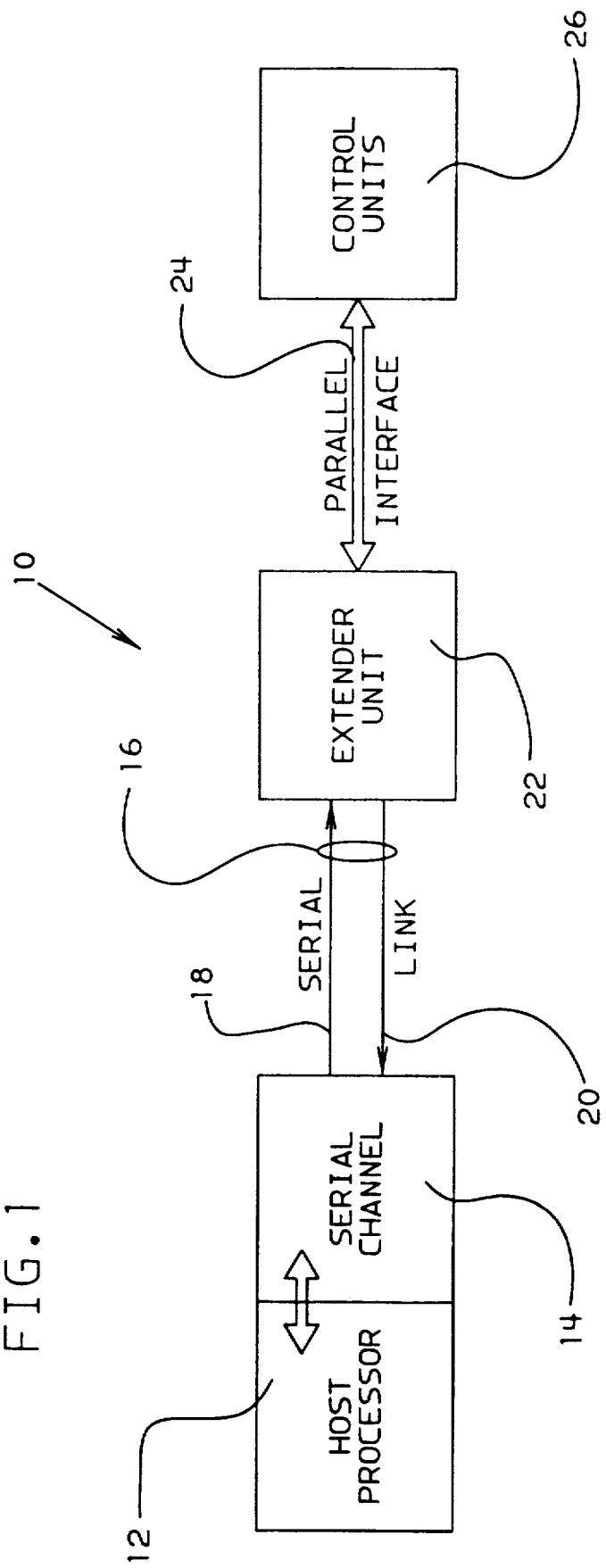
FIG. 1 is a schematic block diagram of an extended channel incorporating an interface constructed in accordance with the present invention.

Referring first to FIG. 1., a system 10 incorporating the present invention includes a host processor 12, which communicates by way of a parallel bus (not separately shown) with a channel 14. Channel 14, in turn, communicates serially with a channel extender unit 22 by way of a duplex fiber-optic link 16 comprising an outbound conductor 18 for transmitting information from the channel 14 to the extender unit 22 and an inbound conductor 20 transmitting information back from the extender unit 22 to the channel 14. Extender unit 22 in turn communicates with one or more control units (CUs) 26 by way of a parallel interface 24 comprising bus and tag lines. The protocols governing the serial link communications between the channel 14 and the extender unit 22 are described in the copending application of D. F. Casper et al. referred to above. The serialized characters flowing on the serial link 16 are described in Franaszek et al. U.S. Pat. No. 4,486,739, which patent is incorporated herein by reference.

If the link 16 is idle, then only idle characters flow in either direction. If either conductor of the link 16 becomes non-idle, then this means that a frame is flowing in that direction. Frames may flow in both directions on the link 16 simultaneously. A normal frame conforming to the protocol referred to above consists of (1) a two-character passive-start-of-frame (PSOF) delimiter, (2) data-type characters including (a) an architecture identifier (AID) character (b), from 1 to 130 frame contents characters, and (c) two cyclic redundancy check (CRC) characters followed by (3) a three-character disconnect-end-of-frame (DEOF) delimiter. An outbound frame originating from the channel 14 can contain from 1 to 18 frame contents characters, while an inbound frame originating from the extender unit 22 can contain from 1 to 130 frame contents characters. Four types of outbound frames (command, data, control and test) and four types of inbound frames (status, data, control and test) are defined in the protocol identified above. Data frames are variable in length, and contain from 1 to 16 data bytes, and are used to transfer data between the main storage (not shown) associated with the channel 14 and host processor 12 and the devices attached to control units 26.

Figure 2:
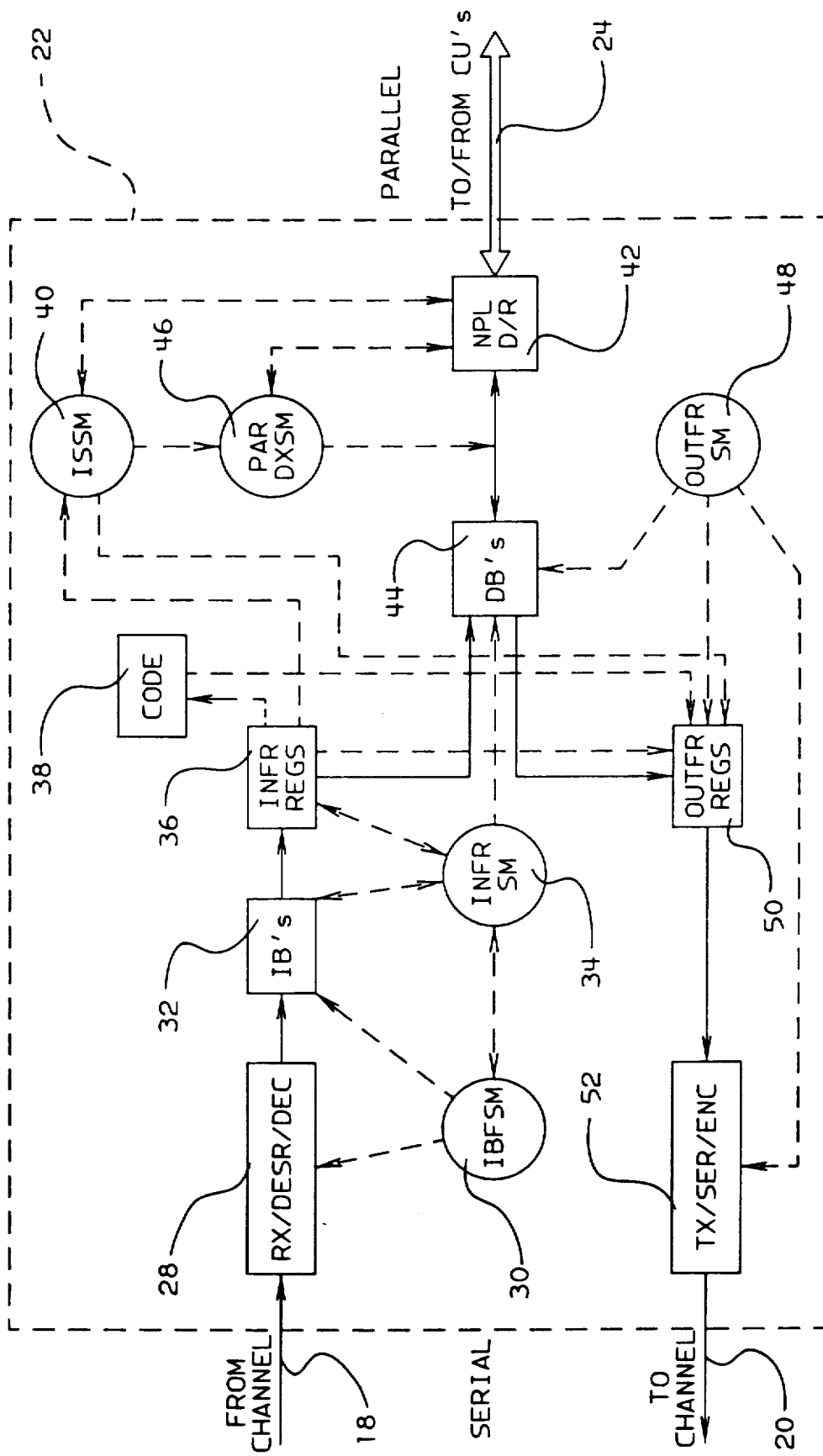
FIG. 2 is a schematic block diagram of the extender unit of the extended channel shown in FIG. 1.

Referring now to FIG. 2, extender unit 22 contains a receiver/deserializer/decoder (RX/DESR/DEC) 28, hereinafter simply "decoder", which converts serialized light pulses to electrical signals, accumulates successive groups of ten serial bits into ten-bit transmission code characters, and converts the ten-bit transmission code characters to eight-bit format characters containing bits 0 to 7, a "K" bit and an odd parity bit (P). The K bit is used to distinguish the special ten-bit transmission codes (K characters) used as idle characters, frame delimiters and special continuous sequences from data-type characters, as described in U.S. Pat. No. 4,486,739, referred to above.

A first clocked logic circuit, more specifically, an In Buffer Fill State Machine (IBFSM) 30, to be described in detail further below, detects the arrival of a frame from the channel 14 (FIG. 1), checks the frame including the CRC characters for validity and stores the frame in one of two dual-port buffers constituting the In-frame Buffers (IBs) 32. A frame is considered arriving into extender unit 22 if an SOF delimiter is received, which usually occurs after receiving one or more idle characters. Each storage location of buffers 32 stores 9 bits, i.e. data bits 0-7 and the parity bit P; the K bit is not stored since it is always 0 for a data-type character. Each of the two dual-port buffers which together constitute IBs 32 is capable of holding 20 characters, which is sufficient for the maximum outbound frame contents of 18 characters plus 2 CRC characters. The CRC characters are written into IBs 32 since they cannot be recognized as CRC characters in advance of receiving the first K character of the DEOF delimiter. They are also used for logout purposes in case a CRC error is detected by IBFSM 30.

Figure 5:
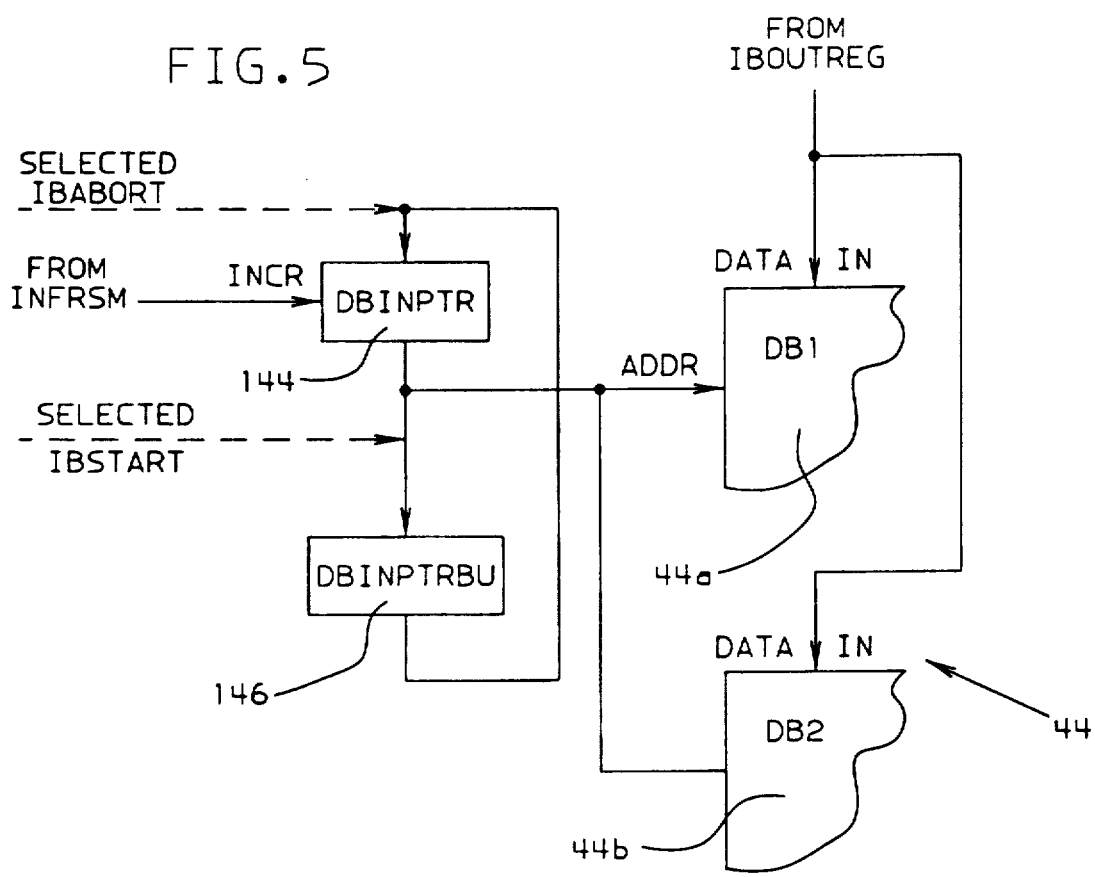
FIG. 5 is a schematic block diagram of the data buffer pointer registers associated with the data buffers shown generally in FIG. 2.

A second clocked logic circuit, more specifically, an In Frame State Machine (INFRSM) 34, controls the transfer of incoming data from the in-frame buffers 32 to storage means, more particularly, a pair of data buffers (DBs) indicated collectively by the reference number 44 and comprising a pair of individual buffers 44a and 44b (FIG. 5). For the purposes of this disclosure in-frame buffers 32 may be regarded as the input buffers and data buffers 44 may be regarded as the output buffers, since it is data transfers from the former to the latter with which the present invention is concerned. INFRSM 34 also moves portions of the frame into a set of in-frame registers (INFRREGS) 36 to decode the type of frame being processed. If it is a command frame, INFRSM 34 sends it to an Initial Selection State Machine (ISSM) 40 for execution. Certain control frames and all test frames, on the other hand, are executed by a microprocessor 38 ("CODE" in FIG. 2) running under the control of stored microcode. Microprocessor 38 is also responsible for reset and initialization sequences, error detection and reporting, and diagnostic controls.

A Parallel Data Transfer State Machine (PARDXSM) 46, operating under the supervisory control of ISSM 40, controls the transfer of data from data buffers 44 to parallel interface 24 by way of NPL driver/receiver module (NPLD/R) 42. Module 42 converts the extender unit signal levels to those required to drive interface 24.

PARDXSM 46 also controls the transfer of data in the other direction, from interface 24 through module 42 to data buffers 44, in the case of a read operation. An Out Frame State Machine (OUTFRSM) 48 controls the subsequent transfer of read data from data buffers 44 to an encoder/serializer/transmitter (TX/SER/ENC) 52, which encodes successive bytes into a suitable transmission format, converts the parallel bytes to serial form, and transmits the serial signal as light pulses on conductor 20 to channel 14 (FIG. 1). OUTFRSM 48 operates in conjunction with a set of out-frame registers (OUTFRREGS) 50.

Decoder 28 and IBFSM 30 are timed by a Receive Byte Clock (RBC), internal to decoder 28, which uses the incoming signal from channel 14 (FIG. 1) to generate a clock that is synchronous with the channel transmitter clock. On the other hand, INFRSM 34, PARDXSM 46 and the other clocked logic circuits of extender unit 22 are timed by a Transmit Byte Clock (TBC) which, while having the same nominal frequency (e.g., 20 MHz) as the Receive Byte Clock (RBC), runs asynchronously relative thereto. Although not necessary for an understanding of the present invention, a fuller description of the general operation of the extender unit 22 may be found in the copending applications of D. F. Casper et al. and M. E. Carey et al. referred to above, which applications are incorporated herein by reference.

Figure 3B:
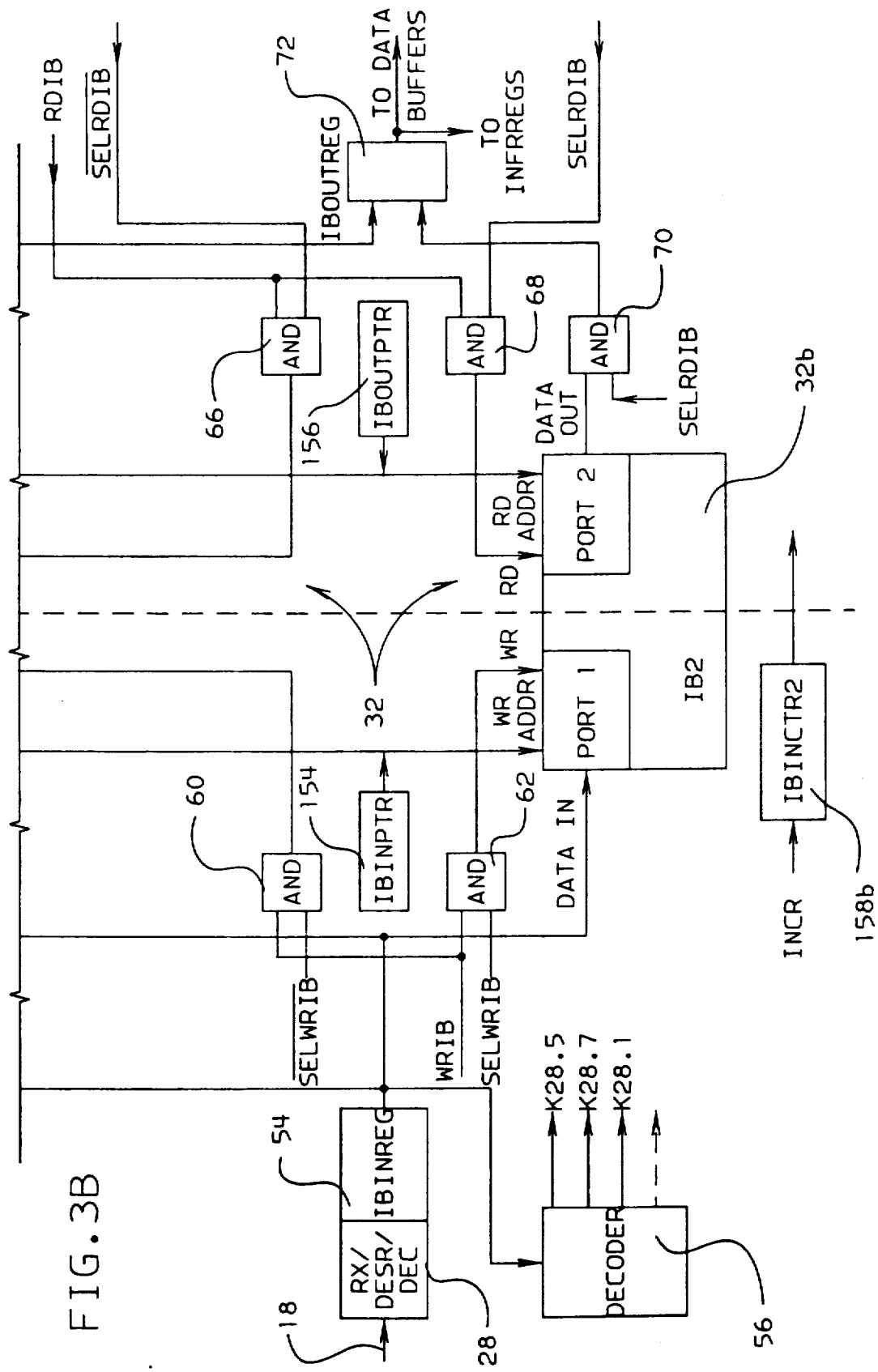

Referring to FIG. 3, input buffers 32 comprise a pair of dual-port buffers 32a (IB1) and 32b (IB2). A first port of each of buffers 32a and 32b receives parallel data inputs from an IBIN register (IBINREG) 54 contained in decoder 28. IBINREG 54 also supplies its output to a decoder 56 of IBFSM 30, which detects the presence of a K character as distinguished from a data-type character, the type of K character if present, and whether an AID character conforms to the protocol (i.e., is a hex '00'). IBINREG 54 additionally supplies its output to a CRC generator/checker 58 contained in IBFSM 30, which performs a CRC check on the frame being received. The first ports of buffers 32a and 32b also receive write inputs from respective AND gates 60 and 62, each of which receives one input from a WRIB line of IBFSM 30. Gate 60 receives a second input from a complemented SELWRIB line from IBFSM 30, while gate 62 receives a second input from a SELWRIB line also originating from IBFSM 30. Finally, the first port of each of buffers 32a and 32b receives a write address input from an in-pointer register (IBINPTR) 154 of IBFSM 30. IBFSM 30 activates the WRIB line synchronously with the RBC clock to transfer a byte of incoming data from IBINREG 54 to the buffer 32a or 32b determined by the logic level of SELWRIB.

IBFSM 30 also includes a pair of input buffer counters 158a and 158b (FIG. 3), which it uses to maintain respective counts IBINCTR1 and IBINCTR2 of the number of frame contents bytes in input buffers 32a and 32b awaiting processing by INFRSM 34.

Figure 4:
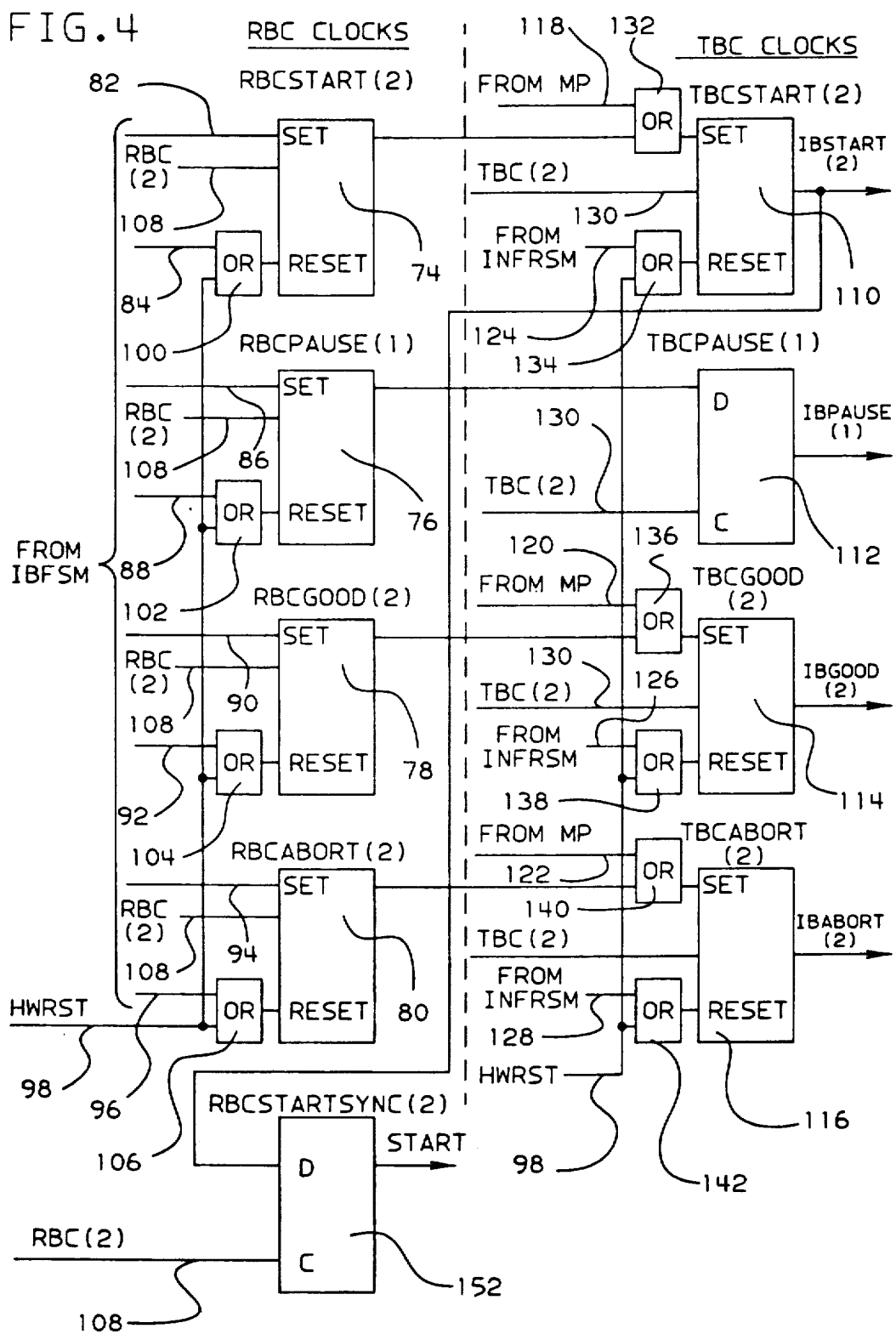
FIG. 4 is a schematic block diagram of the latching circuitry associated with the circuitry shown in FIG. 3.

Referring now to FIG. 4, IBFSM 30 contains various latches for communicating control signals across the asynchronous boundary dividing IBFSM 30 and INFRSM 34 (FIG. 3). Thus, IBFSM 30 contains a pair of RBCSTART latches 74, one for each of buffers 32a and 32b, a single RBCPAUSE latch 76, a pair of RBCGOOD latches 78 ,and a pair of RBCABORT latches 80. For simplicity of exposition, only a single latch of each of the paired latches 74, 78 and 80 is shown in FIG. 4. Latches 74-80 receive respective set inputs from lines 82, 86, 90 and 94 from IBFSM 30 and reset inputs from respective OR gates 100, 102, 104 and 106. OR gates 100-106 receive respective first inputs from lines 84, 88, 92 and 96 from IBFSM 30 and each receive a second input from a hardware reset (HWRST) line 98 originating from microprocessor 38 (FIG. 2).

Each of latches 74-80, in a manner well known in the art, comprises an input latch followed by an output latch and receives clocking signals from a pair of lines 108 (shown in FIG. 4 as a single line) originating from the Receive Byte Clock (RBC). The respective clocking signals supplied to latches 74-80 are so timed that, on each cycle of the Receive Byte Clock (RBC) the input latch half is loaded with the information appearing at the latch inputs, following which that information is transferred from the input latch half to the output latch half.

In a similar manner, INFRSM 34 contains a pair of TBCSTART latches 110, a single TBCPAUSE latch 112, a pair of TBCGOOD latches 114, and a pair of TBCABORT latches 116. For simplicity of exposition, latches 110, 114 and 116, although paired to correspond with respective buffers 32a and 32b, are each shown as only a single latch in FIG. 4. TBCPAUSE latch 112 is a polarity hold latch which, as shown in FIG. 4, receives its D-input directly from the output of RBCPAUSE latch 76. The output of latch 112 takes on the new value appearing at the D-input on each TBC clock cycle.

Latches 110, 114 and 116 receive respective set inputs from OR gates 132, 136 and 140, each of which receives one input from the corresponding latch in IBFSM 30 and a second input from a line 118, 120 or 122 originating from the microprocessor 38. Lines 118-122 are used for diagnostic purposes only and are normally inactive. Likewise, latches 110, 114 and 116 receive respective reset inputs from OR gates 134, 138 and 142, each of which receives one input from HWRST line 98 and a second input from a line 124, 126 or 128 originating from INFRSM 34. Finally, each of latches 110-116 receives clocking signals from a pair of lines 130 (shown as a single line in FIG. 4) originating from the Transmit Byte Clock (TBC). As in the case of latches 74-80 of IBFSM 30, latches 110-116 of INFRSM 34 each comprise an input latch half and an output latch half, which are consecutively triggered on each cycle of the Transmit Byte Clock (TBC).

Considering again the RBC side of the RBC-TBC asynchronous boundary shown in FIG. 4, IBFSM 30 also includes a pair of RBCSTARTSYNC latches 152 corresponding respectively to input buffers 32a and 32b. Latches 152 are polarity hold latches, similar to TBCPAUSE latch 112, which receive clock inputs from RBC lines 108 and respective D-inputs from the corresponding IBSTART outputs of TBCSTART latches 110. IBFSM 30 uses latches 152 to determine, prior to filling a selected input buffer 32a or 32b with data from a frame, whether the buffer has been emptied of data from a previous frame by INFRSM 34.

Referring again to FIG. 3, INFRSM 34 also contains an in-frame buffer output register (IBOUTREG) 72, which receives gated outputs from respective buffers 32a and 32b. Thus, if a signal SELRDIB generated by INFRSM 34 is low, IBOUTREG 72 receives data from the second port of buffer 32a by way of gate 64, while if SELRDIB is high, IBOUTREG 72 receives data from the second port of buffer 32b by way of gate 70. Respective gates 66 and 68 supply the second port of a selected buffer 32a or 32b with a RDIB signal generated by INFRSM 34 synchronously with the TBC clock, the selection depending on the logic level of the SELRDIB signal also generated by INFRSM 34. An input buffer out-pointer register (IBOUTPTR) 156 similar to in-pointer register 154 of IBFSM 30 is used by INFRSM 34 to address via the second port the location of the selected buffer 32a or 32b from which data is read.

Referring to FIG. 5, INFRSM 34 also includes a data buffer in-pointer register (DBINPTR) 144, which it uses to address the selected buffer 44a or 44b to transfer bytes thereto from IBOUTREG 72. Associated with DBINPTR 144 is a backup pointer register (DBINPTRBU) 146. Upon receiving an IBSTART signal from the selected latch 110 (FIG. 4), INFRSM 34 transfers the existing contents of DBINPTR 144 to DBINPTRBU 146. In the event of a subsequent IBABORT signal from the selected TBCABORT latch 116 (FIG. 4), the previously saved contents are restored to register 144 from backup register 146. In this manner, in the event that an incoming frame is aborted, INFRSM 34 in effect disregards the existence of any bytes of the aborted frame that it has written into DB 44.

Figure 6:
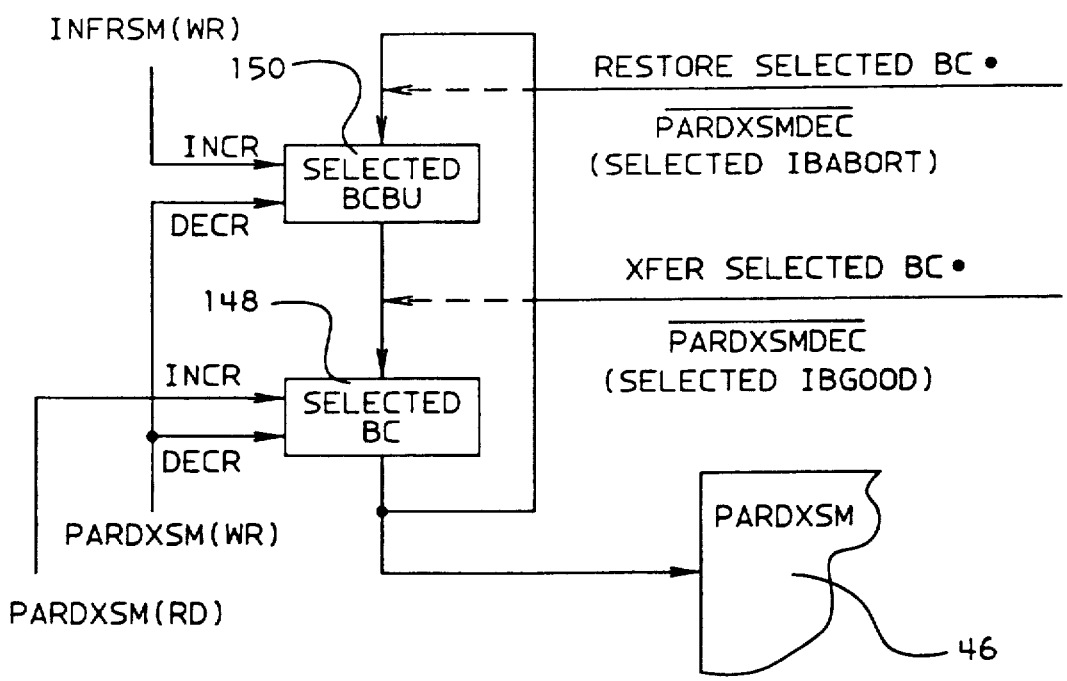
FIG. 6 is a schematic block diagram of the byte counters associated with each of the data buffers shown generally in FIG. 2.

Referring now to FIG. 6, for each of the two buffers of DB 44, INFRSM 34 and PARDXSM 46 share a byte counter (BC) 148 and a backup byte counter (BCBU) 150. Counters 148 and 150 are used to keep track of the number of bytes in the corresponding buffer 44a or 44b awaiting processing by PARDXSM 46. Thus, upon each transfer of a byte from the selected buffer 32a or 32b to the selected buffer 44a or 44b, INFRSM increments BCBU 150. Similarly, upon reading each byte of data from the selected buffer 44a or 44b during channel write operations, PARDXSM 46 decrements the BC 148 and BCBU 150 corresponding to that buffer. PARDXSM 46 also increments the selected BC 148 each time it transfers a byte of data to the selected buffer 44a or 44b from the parallel interface 24 during channel read operations.

As is apparent from this description, INFRSM 34 increments only the backup counter 150 as it is transferring data from the selected buffer 32a or 32b to the selected buffer 44a or 44b. Upon subsequently receiving an IBGOOD signal from the selected TBCGOOD latch 114 (FIG. 4), and following the termination of any decrementing signal from PARDXSM 46, INFRSM 34 transfers the byte count from the selected backup counter 150 to the selected counter 148. On the other hand, in the case of an aborted frame, and following the termination of any decrementing signal from PARDXSM 46, INFRSM 34 restores the byte count from the end of the previous frame from counter 148 to backup counter 150. Since counter 148 is the only one of each pair of counters 148 and 150 that is readable by PARDXSM 46, INFRSM 34 in effect masks the byte count for the selected buffer 44a or 44b from PARDXSM 46 until INFRSM 34 has established that the incoming frame is good.

Figure 9:
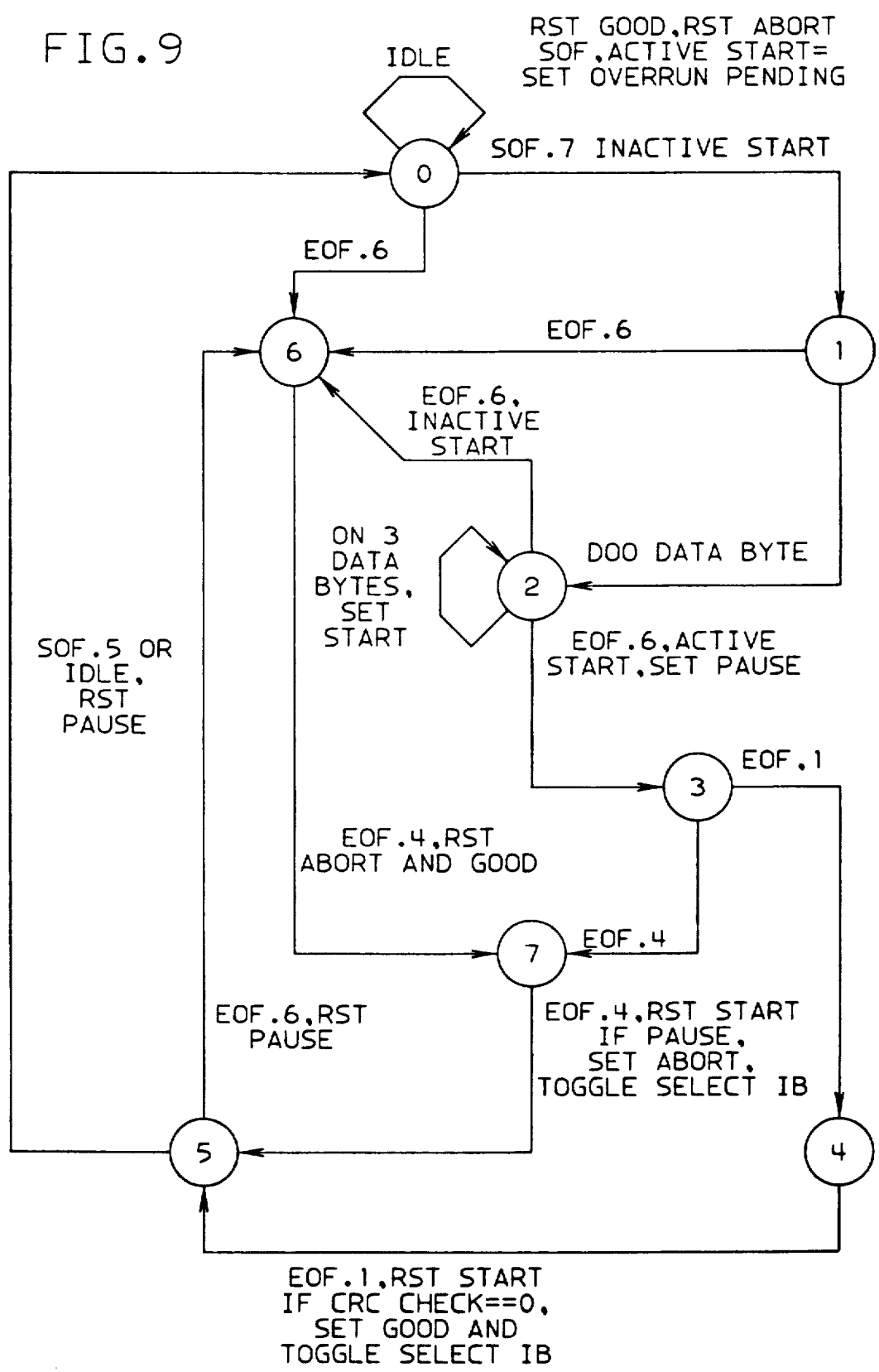
FIG. 9 is a flow diagram illustrating the operation of the In Buffer Fill State Machine (IBFSM) of the extender unit shown in FIG. 2.

The operation of IBFSM 30 for a valid write data frame will now be described, with particular reference to FIGS. 7 and 9. Normally, when incoming line 18 from channel 14 carries idle (K28.5) characters, IBFSM 30 remains in state 0. While in this state IBFSM 30 continually enters a loop in which it examines the output of IBINREG 54 by way of decoder 56 for a start of frame (SOF) delimiter consisting of a K28.5 character ("SOF.5" in FIG. 9) followed by a K28.7 character ("SOF.7" in FIG. 9). Upon receiving such a succession of K characters, and if the selected start as indicated by the selected RBCSTARTSYNC latch 152 is inactive, IBFSM 30 enters state 1. If at this time the selected RBCSTARTSYNC latch 152 is active, IBFSM 30 sets an "overrun pending" error condition, since INFRSM 34 has not finished processing data from the selected input buffer 32a or 32b.

Upon entering state 1, IBFSM 30 monitors IBINREG 54 for either the correct AID character (in this particular example a hex '00') or the K28.6 ("EOF.6" in FIG. 9) of an AEOF delimiter; detection of any other character will set a pending error condition. If such an AID character is received, IBFSM then enters state 2 (FIG. 9) to start the normal data-handling loop for writing incoming data into the selected input buffer 32a or 32b. On entering state 2, IBFSM 30 begins writing the incoming frame contents bytes into the selected buffer 32a or 32b of IB 32, one byte per RBC clock cycle, beginning with the first frame contents byte following the AID character. IBFSM 30 increments IBINPTR 154 each time it writes a frame contents byte into the selected, input buffer 32a or 32b. IBFSM 30 also cycles each frame contents byte through the CRC checker 58. Upon receiving the third such byte following the AID character, IBFSM 30 sets the selected RBCSTART latch 74 (FIG. 4). This results in the setting of the corresponding TBCSTART latch 110 on the next TBC clock cycle. The selected IBSTART signal generated by the selected TBCSTART latch 110 tells INFRSM 34 to begin transferring data from the selected input buffer 32a or 32b to the selected output buffer 44a or 44b, one byte at a time in synchronism with the TBC clock. Also at this time, IBFSM 30 begins incrementing the selected counter 158a or 158b for each byte transferred from IBINREG 54 to the selected buffer 32a or 32b.

IBFSM 30 delays incrementing the selected counter 158a or 158b until the transfer of the third frame contents byte to the selected register 32a or 32b because, as noted, above, the two terminal CRC characters appear to be frame contents bytes and are not recognized as CRC characters until the following K28.6 character of an EOF delimiter is detected. Ignoring the first two data characters compensates the byte count for the two CRC characters necessarily included in the count. As a result, INFRSM 34, which bases its actions on the contents of the selected counter 158a or 158b, will not transfer the CRC characters from the selected input buffer 32a or 32b to the selected data buffer, even though the CRC characters have been loaded into the input buffer.

IBFSM 30 continues to fill the selected buffer of IB 32 with bytes from IBINREG 54 and to increment IBINPTR 154 and the selected counter 158a (IBINCTR1) or 158b (IBINCTR2) in this fashion until it detects the reception of a K28.6 character, which indicates the beginning of either a disconnect-end-of-frame (DEOF) delimiter (K28.6-K28.1-K28.1) or an abort-end-of-frame (AEOF) delimiter (K28.6-K28.4-K28.4). Upon detecting such a K28.6 character, and if the selected RBCSTARTSYNC latch 152 (FIG. 4) is active, IBFSM 30 sets the RBCPAUSE latch 76 (FIG. 4). This results in the setting of the TBCPAUSE latch 112 on the next TBC clock cycle. The IBPAUSE signal generated by TBCPAUSE latch 112 tells INFRSM 34 to halt the further transfer of data from IB 32 to DB 44. IBFSM 30 also stops writing data into the selected buffer 32a or 32b and transitions to state 3. While in state 3, IBFSM 30 expects either a K28.1 character ("EOF.1" in FIG. 9) or a K28.4 character ("EOF.4" in FIG. 9) from IBINREG 54 of decoder 28. Detection of a K28.1 character indicates that a DEOF delimiter is being received, and IBFSM 30 transitions to state 4.

While in state 4, IBFSM 30 monitors IBINREG 54 of decoder 28 for another K28.1 character. Detection of the second K28.1 character indicates the completion of a valid DEOF delimiter, causing IBFSM 30 to reset the selected RBCSTART latch 74 (FIG. 4), verify that the CRC check as indicated by circuit 58 (FIG. 3) is correct, set the selected RBCGOOD latch 78 (and thus the selected IBGOOD signal on the next TBC clock cycle) if the CRC check is good, toggle its SELWRIB pointer (FIG. 3), and transition to state 5. Setting the selected RBCGOOD latch 78 signals INFRSM 34 that the latter may continue with processing the frame and may regard it as a valid frame for the purpose of updating the registers and counters shown in FIGS. 5 and 6. If the CRC check had not been good, the selected RBCGOOD latch 78 would not have been set, and a CRC error condition would be set instead. In response 2 this error condition, or any other condition, microprocessor 38 generates a logout and resets the state machines and associated latches by pulsing HWRST line 98.

While in state 5, IBFSM 30 expects either a K28.5 (idle) character or the first character (K28.6) of an AEOF delimiter. Upon detecting a K28.5 character, IBFSM 30 resets the RBCPAUSE latch 76 (and thus the IBPAUSE signal on the next TBC clock cycle) and returns to the idle state (state 0).

Figure 8C:
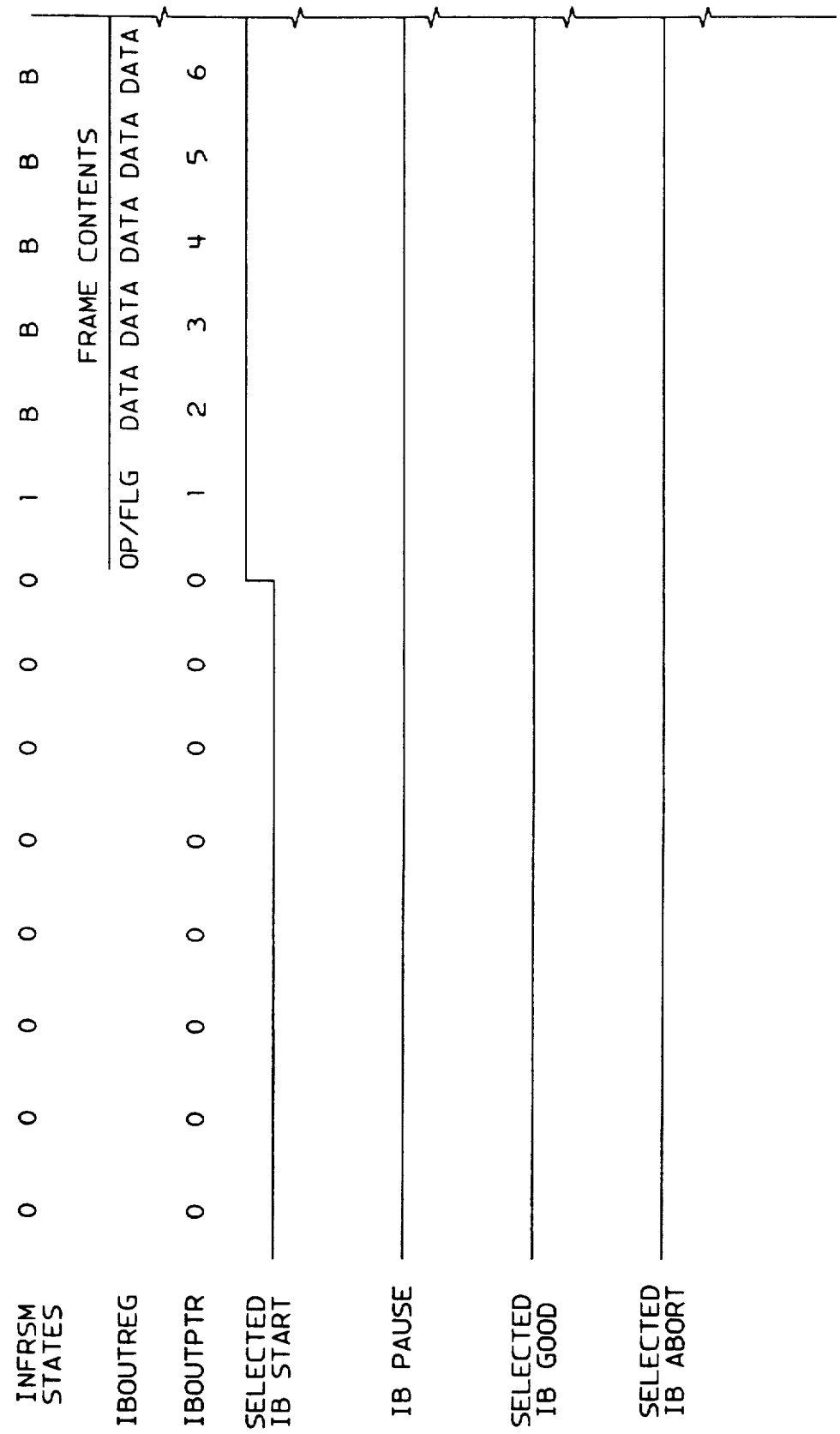

The above description of the operation of IBFSM 30 assumed the reception of a valid write data frame terminated by a normal DEOF delimiter. If while in state 3, IBFSM 30 had detected a K28.4 character, indicating an AEOF delimiter rather than an DEOF delimiter, IBFSM 30 would transition to state 7, as shown in FIG. 8, instead of state 4. While in state 7, IBFSM 30 would monitor the output of IBINREG 54 of decoder 28 for another K28.4 character. Detection of the second K28.4 character completes a valid AEOF delimiter and causes IBFSM 30 to reset the selected RBCSTART latch 74. Further, if RBCPAUSE latch 76 is active, IBFSM 30 sets the selected RBCABORT latch 80, toggles the SELWRIB pointer, resets any pending error condition and transitions to state 5. Once it reaches state 5, IBFSM 30 functions in the manner described above for a valid write data frame.

IBFSM 30 transitions to state 6 if it detects a K28.6 character while in state 0 or state 1, or while in state 2 if the selected RBCSTARTSYNC latch 152 is inactive. IBFSM 30 also transitions to state 6 after resetting the RBCPAUSE latch 76 if it detects a K28.6 character while in state 5. While instate 6, IBFSM monitors IBINREG 54 of decoder 28 for a K28.4 character. Detection of such a character indicates that an AEOF delimiter is being received. IBFSM 30 resets the selected RBCGOOD and RBCABORT latches 78 and 80 and transitions to state 7, at which point it operates in the manner described above.

Latches 74–80, together with counters 158a (IBINCTR1) and 158b (IBINCTR2), are the means by which IBFSM 30 communicates with INFRSM 34 across the asynchronous interface between the circuitry controlled by the Receive Byte Clock (RBC) and that controlled by the Transmit Byte Clock (TBC). Each of RBC latches 74–80, when set, is set to remain on for at least two RBC clock cycles to ensure that at least one complete asynchronous TBC clock cycle is encompassed. This ensures that INFRSM 34 detects the setting of the RBC latch.

Figure 10:
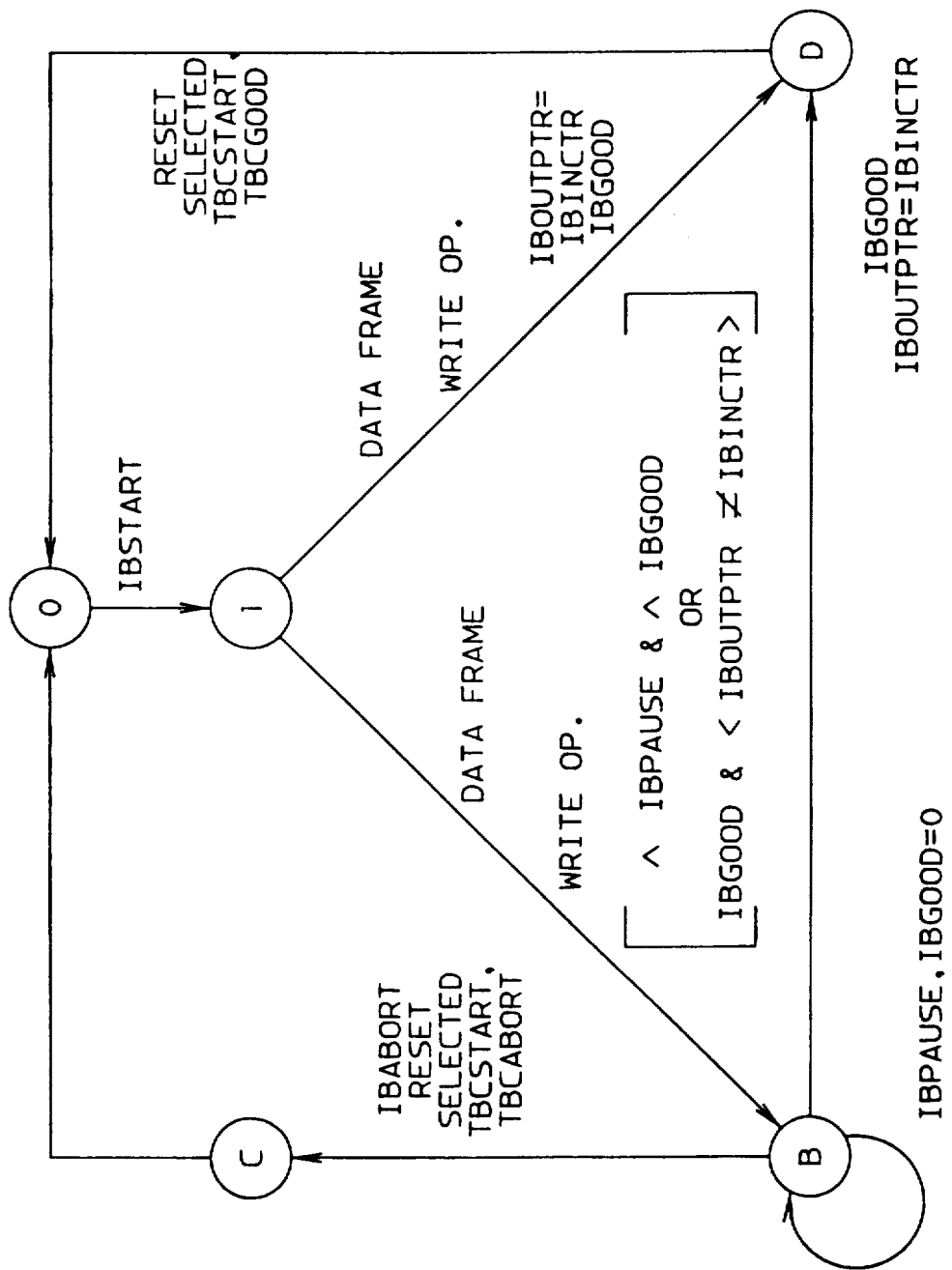
FIG. 10 is a flow diagram illustrating the operation of the In Frame State Machine (INFRSM) of the extender shown in FIG. 2.

The operation of INFRSM 34 for a valid write data frame will now be described with reference to FIGS. 7 and 10. Normally, INFRSM 34 loops in its own state 0, monitoring the asynchronous interface for an active IBSTART signal from the selected TBCSTART latch 110. Upon detecting such a signal, INFRSM 34 reads the first frame contents byte from the selected buffer 32a or 32b and sequences to state 1. Also at this time, INFRSM 34 transfers the contents of pointer register (DBINPTR) 144 (FIG. 5) to backup pointer register (DBINPTRBU) 146, so that the previous pointer position may be restored if the frame is ultimately aborted.

The first byte written into the selected buffer 32a or 32b will always be the op/flags byte. INFRSM 34 updates an op/flags register (OPFLGSREG) of INFRREGS 36 and decodes the op/flags byte to determine the type of frame arriving from channel 14. In the system described in the above-identified copending application, the frame arriving from channel 14 will always be (1) a command frame, having a fixed length of six frame contents characters; (2) a control frame, having a fixed length of three frame contents characters; (3) a data frame having a variable length of 1–17 frame contents characters as indicated by the selected counter 158a or 158b; or (4) a test frame having a length of 1–18 frame contents characters as indicated by the selected counter 158a or 158b. Also during state 1, INFRSM 34 monitors the asynchronous interface for an active IBPAUSE, IBGOOD, or IBABORT indication from IBFSM 30, the IBGOOD and IBABORT indications monitored being, of course, those for the selected buffer 32a or 32b.

If none of these indications are active, INFRSM 34 will read the next byte from the selected buffer 32a or 32b and sequence to the next state, which is determined by the frame type that is being executed. It will be assumed for the purpose of the following description that the incoming frame, as indicated by the op/flags byte, is a write data frame. Other types of frames, however, may be processed in a similar manner.

Assuming, as stated above, that the incoming frame is a write data frame, INFRSM 34 enters state B or state D, depending on the contents of IBOUTPTR 156 and the selected IBINCTR 158a or 158b and the logic levels of IBPAUSE and IBGOOD. If both the selected IBPAUSE and the selected IBGOOD are inactive, or if the selected IBGOOD is active but does not equal IBINCTR, INFRSM 34 changes from state 1 to state B. As shown in FIG. 7, upon entering state B, INFRSM 34 begins to transfer data from the selected buffer 32a or 32b (FIG. 3) to the selected buffer 44a or 44b (FIG. 5), incrementing IBOUTPTR, DBINPTR 144 (FIG. 5) and the selected BCBU 150 (FIG. 6) as it does so. During this time, INFRSM 34 constantly monitors the asynchronous interface (FIG. 4) for a signal from the IBPAUSE line or from the selected IBGOOD or IBABORT line. Upon detecting an IBPAUSE signal, INFRSM 34 temporarily halts the transfer of data from the selected buffer 32a or 32b to DB 44 and incrementing of the pointer IBOUTPTR, and awaits an IBGOOD or IBABORT signal from the selected TBC latch 114 or 116. Upon subsequently detecting an IBGOOD signal from the selected TBCGOOD latch 114 (FIG. 4), INFRSM 34 compares IBOUTPTR with IBINCTR. If IBOUTPTR is less than IBINCTR, INFRSM 34 continues to transfer bytes from the selected buffer 32a or 32b to the selected buffer 44a or 44b, incrementing IBOUTPTR, DBINPTR 144 (FIG. 5) and the selected BCBU 150 (FIG. 6) as it does so. When, finally, IBOUTPTR equals IBINCTR, INFRSM 34 changes to state D, where it transfers the contents of the selected BCBU 150 (FIG. 6) to the selected BC 148 to reveal the new byte count to PARDXSM 46. INFRSM then toggles its SELRDIB pointer (FIG. 3) and resets the selected TBCSTART and TBCGOOD latches 110 and 114 (FIG. 4) before returning to the idle state (state 0).

Usually, as in the example shown in FIG. 7, the incoming write data frame will contain a sufficient number of bytes that INFRSM 34 will transition to state B before transitioning to state D. Occasionally, however, in the case of a very short frame, IBOUTPTR will already be equal to IBINCTR when the selected IBGOOD latch is set. In such a case, INFRSM 34 changes directly from state 1 to state D, without passing through state B as an intermediary state. Otherwise, the manner of operation is similar to that described above.

If an incoming write data frame is aborted, then INFRSM 34 will detect an IBABORT signal from the selected TBCABORT latch 116 (FIG. 4) as shown in FIG. 8, rather than an IBGOOD signal from the selected TBCGOOD latch 114 as shown in FIG. 7. In such a case, INFRSM 34 halts any further transfer of data from the selected input buffer 32a or 32b, if it has not already done so, and transitions to state C instead of state D. On entering state C, INFRSM 34 transfers the contents of the backup pointer register (DBINPTRBU) 146 to the principal pointer register (DBINPTR) 144 (FIG. 5) and transfers the contents of the selected byte counter (BC) 148 to the selected backup byte counter (BCBU) 150 (FIG. 6). The latter two transfers in effect restore register 144 to its former state, as it existed before the arrival of the aborted frame. That portion of the aborted frame which may have been transferred to DB 44 is, in effect, masked from PARDXSM 46, and INFRSM 34 will overwrite the data from the aborted frame when the next incoming frame from channel 14 is received. After these operations have been performed, INFRSM 34 toggles its SELRDIB pointer (FIG. 3), resets the selected TBCSTART and TBCABORT latches 110 and 116 (FIG. 4) and returns to state 0. In effect, the state of the hardware remains unaltered, as if the aborted frame had never been received.

As shown in FIG. 7, the processing of a 16 byte write, data frame is overlapped across the asynchronous interface, with the selected buffer 32a or 32b being emptied by INFRSM 34 while it is being filled with incoming data by IBFSM 30. As shown in that figure, the total processing period, which begins with the reception of the initial K28.5 character of a PSOF delimiter and ends with the resetting of the TBC latches by INFRSM 34, spans 28 clock cycles. By contrast, the total processing period would span 41 cycles if the processing by INFRSM 34 were to be delayed until IBFSM 30 had detected the final K28.1 character of the DEOF delimiter.

Although the asynchronous data interface of the present invention finds special application in the channel extender unit described herein, it is not limited to use in such a unit, nor is it limited to systems using fiberoptic links. It could, for example, also be used in the serial channel itself for the reception of serial frames from the extender unit. More generally, the data interface of the present invention could be used in any application where there is the need to process incoming serial frames before they are completely received or checked for validity.

While the invention has been particularly shown and described with reference to preferred embodiments thereof, it will be understood by those skilled in the art that various changes in form and details may be made therein without departing from the spirit and scope of the invention.

What is claimed is:

1. An asynchronous interface for processing serial frames of data transmitted in synchronism with a first clock, said interface comprising:
   means for deserializing data from one of said frames synchronously with said first clock;
   an input buffer;
   an output buffer;
   first means for filling said input buffer with said deserialized data from said frame synchronously with said first clock;
   frame checking means for determining the validity of said frame upon the completion of said filling operation;
   second means for transferring said data from said frame from said input buffer to said output buffer synchronously with a second clock asynchronous with said first clock, said second means beginning said transfer operation before said first means has completed said filling operation so that at least a portion of said data from said frame has been transferred from said input buffer to said output buffer by the time the validity of said frame has been determined; and
   means responsive to said frame checking means for controlling the accessibility of said portion of said data from said output buffer.

2. An interface as in claim 1 in which said input buffer comprises a first input buffer, said interface further comprising a second input buffer, said first means alternatingly filling said first input buffer and then said second input buffer with said frames.

3. An interface as in claim 1 in which said frames contain frame contents bytes and frame delimiter bytes, said first means beginning said filling operation upon the receipt of a frame contents byte.

4. An interface as in claim 1 in which said second means begins transferring data from said input buffer upon the filling thereof with a predetermined portion of a frame.

5. An interface as in claim 1 in which said output buffer has a pointer register indicating the location in said output buffer to which data from said input buffer is written and a backup register, said controlling means comprising:
means operable at the beginning of said transfer step for saving the contents of said pointer register in said backup register; and
means responsive to the detection of an invalid frame for transferring the contents of said backup register to said pointer register.

6. An interface as in claim 1 in which said output buffer has a principal counter indicating the amount of data in said output buffer available for reading from said output buffer and a backup counter, said controlling means comprising:
means responsive to the transfer of data from said input buffer to said output buffer for indexing said backup counter; and
means responsive to the detection of a valid frame for transferring the contents of said backup counter to said principal counter.

7. A data processing system including an interface as in claim 1.

8. Apparatus as in claim 1 in which said output buffer has a predetermined state at the beginning of said transfer operation, said controlling means including means responsive to the detection of an invalid frame for restoring said output buffer to said predetermined state.

9. A method of processing serial frames of data transmitted in synchronism with a first clock, including the steps of:
deserializing data from one of said frames synchronously with said first clock;
filling an input buffer with said deserialized data from said frame synchronously with said first clock;
determining the validity of said frame upon the completion of said filling step;
transferring said data from said frame from said input buffer to an output buffer synchronously with a second clock asynchronous with said first clock, said transfer step being begun before said filling step has been completed so that at least a portion of said data from said frame has been transferred from said input buffer to said output buffer by the time the validity of said frame has been determined; and
controlling the accessibility of said portion of said data from said output buffer in accordance with said validity determination.

10. A method as in claim 9 in which a second input buffer is filled with said frames alternatingly with a first input buffer.

11. A method as in claim 9 in which said frames contain frame contents bytes and frame delimiter bytes, said filling step being begun upon the receipt of a frame contents byte.

12. A method as in claim 9 in which said transfer step is begun upon the filling of said input buffer with a predetermined portion of a frame.

13. A method as in claim 9 including the steps of incrementing a first count as successive bytes are written into said input buffer, incrementing a second count as successive bytes are transferred from said input buffer, and halting the further transfer of data from said input buffer when said second count equals said first count.

14. A method as in claim 9 in which each of said frames contains n CRC bytes followed by an end-of-frame delimiter, the incrementing of said first count being inhibited for the first n bytes written into said input buffer.

15. A method as in claim 9 in which each of said frames contains an end-of-frame delimiter, said processing step being interrupted upon the receipt of said delimiter.

16. A method as in claim 15 including the step of checking the validity of said frame following the receipt of said delimiter.

17. A method as in claim 16 including the step of continuing said processing step upon the detection of a valid frame.

18. A method as in claim 16 including the step of terminating said processing step upon the detection of an invalid frame.

19. A method as in claim 9 in which said output buffer has a write pointer indicating the location in said output buffer to which data from said input buffer is written, said controlling step includes the steps of:
saving the value of said write pointer at the beginning of said transfer step; and
restoring the saved value of said write pointer upon the detection of an invalid frame.

20. A method as in claim 9 in which said output buffer has a principal counter indicating the amount of data in said output buffer available for reading from said output buffer, said controlling step including the steps of:
indexing a backup counter upon transfer of data from said input buffer to said output buffer; and
transferring the contents of said backup counter to said principal counter upon the detection of a valid frame.

21. A method as in claim 9 in which said output buffer has a predetermined state at the beginning of said transfer step, said controlling step including the step of restoring said output buffer to said predetermined state in response to the detection of an invalid frame.

* * * * *